Jan. 2, 1923.
M. J. FENLON.
EMERGENCY BRAKE LOCK.
FILED DEC. 13, 1920.
1,440,823.
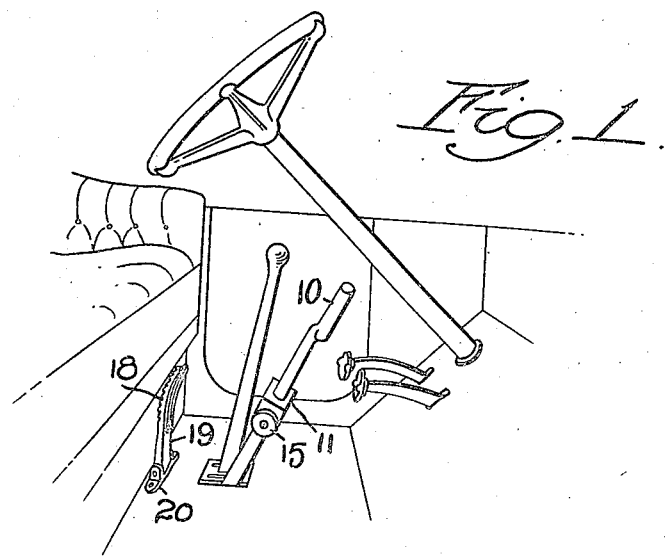
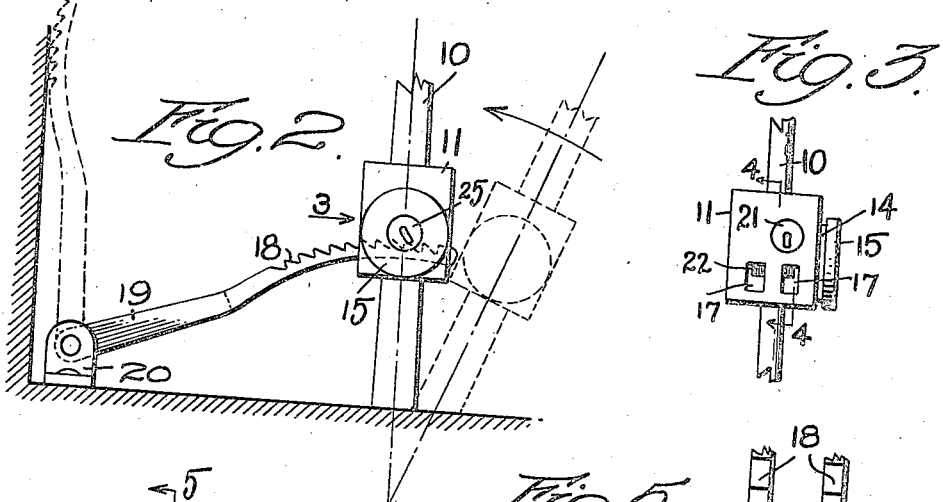
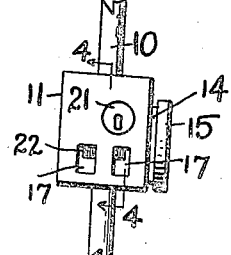
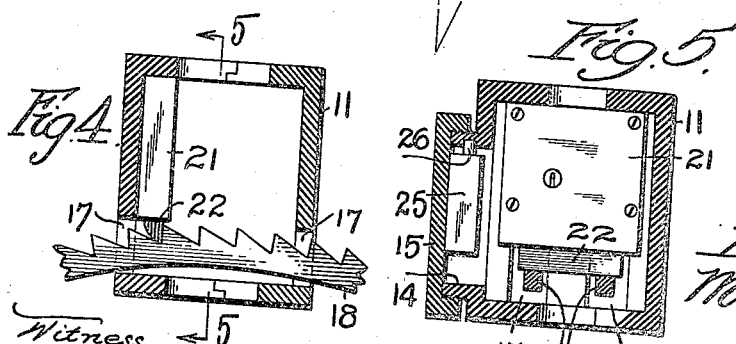
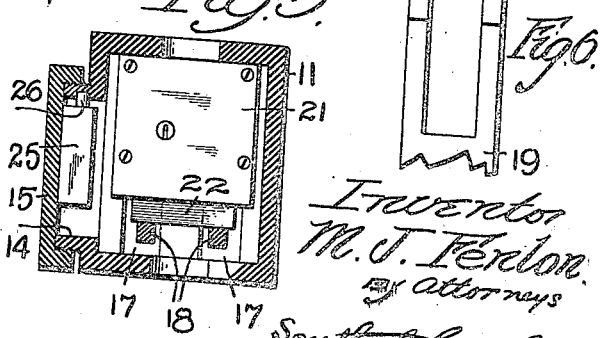
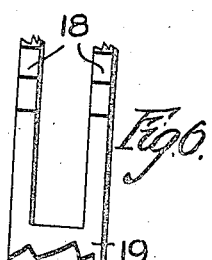
Inventor
M. J. Fenlon
By Attorneys
Southgate & Southgate
Witness
C. F. Nexon Patented Jan. 2, 1923.

1,440,823

UNITED STATES PATENT OFFICE.

MICHAEL J. FENLON, OF WORCESTER, MASSACHUSETTS, ASSIGNOR OF ONE-HALF TO ALFRED A. BIANCHI, OF WORCESTER, MASSACHUSETTS.

EMERGENCY-BRAKE LOCK.

Application filed December 13, 1920. Serial No. 430,109.

*To all whom it may concern:*

Be it known that I, MICHAEL J. FENLON, a citizen of the United States, residing at Worcester, in the county of Worcester and State of Massachusetts, have invented a new and useful Emergency-Brake Lock, of which the following is a specification.

This invention relates to an automobile lock and the principal object thereof is to provide simple and inexpensive means for positively locking an automobile against operation when the emergency brake is set. The invention also involves the provision of safety devices for preventing tampering with the lock to free the machine.

Reference is to be had to the accompanying drawing in which—

Fig. 1 is a perspective view of the front of an automobile showing a preferred embodiment of this invention applied thereto;

Fig. 2 is a side elevation thereof;

Fig. 3 is a front elevation;

Fig. 4 is a central sectional view on the line 4—4 of Fig. 3;

Fig. 5 is a sectional view on the line 5—5 of Fig. 4, and

Fig. 6 is a plan of the locking rack.

My device is designed for the purpose of locking automobiles, but the principle on which this invention is based is the idea of locking the emergency brake so that although the engine can be started, the machine cannot be run. For this purpose I provide the emergency brake lever 10 on its shank with a box 11 clamped thereto. This box is shown as made in two halves with an opening at the top and bottom for the shank of the brake lever. On one side of the casing is a cylindrical projection 14 screw-threaded on the outer surface and formed partly on each member of the casing. This is provided with a cap 15 adapted to screw on and hold the parts of the casing in position so that the casing cannot be dismounted. Furthermore, the two halves of the casing are rabbetted around their edges to fit each other and prevent relative motion of the two parts.

At the back and front of the casing are two pairs of openings 17 spaced apart and located substantially at the same height near the bottom of the casing. These openings are designed to receive a double rack 18 fixed on a member 19 that is pivoted to a bracket 20. This bracket can be fixed to the bottom of the car or to the wall at a short distance above the bottom. This rack member can be turned up against the seat in an inoperative position when not required as shown in Fig. 2. When it is turned down into operative position it is located so that the two racks can enter the openings 17. It is curved on an arc concentric with the pivot of the brake lever 10.

Inside the casing is a lock 21. This is provided with a latch 22 which can conveniently be arranged to extend across the casing behind the two rear openings. It is beveled on the rear and so arranged that as the racks move into these openings the latch, which is spring pressed when the lock is locked, will automatically engage the teeth and prevent the emergency brake from being moved forward from any position in which it is left. This is required because the emergency brake is not always left in exactly the same position when the brake is on. Whatever its position the brake lever will be locked by means of the lock against motion forwardly away from its operative position. Therefore the car cannot be moved.

By being locked, I mean that the lock 21 is left in such position that the spring latch is yieldingly forced down by the springs in the lock. When a key is inserted and turned it will move the latch up so as to release the racks.

I have shown also a second lock 25 on the cap, the bolt 26 of which is adapted to engage in a notch in the wall and prevent the cap from being unscrewed when the device is locked.

From what has been said it will be understood that the device is of a very simple and inexpensive character and will effectively prevent the stealing of a car to which it is applied. It does not lock automatically and therefore does not interfere with any ordinary use of the car. Furthermore, in order to lock it, it is not necessary to use the key but merely to swing the racks down and then move the brake far enough to catch into some part of the rack.

Although I have illustrated and described only a single form of the invention I am aware of the fact that many modifications can be made therein by any person skilled in the art without departing from the scope of the invention as expressed in the claims.

Therefore, I do not wish to be otherwise limited to the details of construction herein shown and described, but what I claim is:—

1. In an automobile, the combination with an emergency brake lever, of a lock mounted on said lever, a pivoted rack connected with the car and adapted to cooperate with said lock to prevent the release of the brake, said rack being adapted to be moved to two positions, in one of which it projects upwardly in the car away from the brake lever, and in the other of which it crosses the brake lever.

2. The combination with the emergency brake lever for an automobile, of a lock movable with said lever, means connected with the car for cooperating with said lock to prevent the release of the brake, a casing fixed on said lever having a spring lock therein, a rack adapted to enter said casing and hold the lock to prevent the retraction of the lever, said casing being formed of two parts having a cover on the side detachably mounted and holding the parts together, and locking means for preventing the removal of the cover.

3. In an automobile, the combination with an emergency brake lever, of a lock mounted on said lever, and a pivoted rack connected with the car and adapted to co-operate with said lock to prevent the release of the brake and movable on its pivot to inoperative position.

In testimony whereof I have hereunto affixed my signature.

MICHAEL J. FENLON.